United States Patent [19]

Shapiro et al.

[11] 4,316,129

[45] Feb. 16, 1982

[54] X-RAY TUBE CONTROL SYSTEM

[75] Inventors: Jonathan S. Shapiro, Greenwich; William P. Holland, West Redding, both of Conn.

[73] Assignee: The Machlett Laboratories, Incorporated, Stamford, Conn.

[21] Appl. No.: 141,086

[22] Filed: Apr. 17, 1980

Related U.S. Application Data

[62] Division of Ser. No. 847,877, Nov. 2, 1977, Pat. No. 4,225,787.

[51] Int. Cl.³ .............................................. H02P 5/16

[52] U.S. Cl. .................................. 318/313; 318/490; 250/406

[58] Field of Search ....................... 318/313, 480, 490; 310/67 R; 324/175; 250/406, 231 SE; 313/60

[56] References Cited

U.S. PATENT DOCUMENTS

| | | | |
|---|---|---|---|
| 3,214,589 | 10/1965 | Teague | 324/175 |
| 3,582,550 | 6/1971 | Latanzi et al. | 318/314 |
| 3,924,167 | 12/1975 | Clark et al. | 318/313 |
| 3,963,930 | 6/1976 | Fiocca et al. | 250/406 |
| 4,065,674 | 12/1977 | Lakerveld et al. | 250/406 |
| 4,162,399 | 7/1979 | Hudson | 324/175 |

FOREIGN PATENT DOCUMENTS

| | | | |
|---|---|---|---|
| 2110017 | 9/1972 | Fed. Rep. of Germany | 324/175 |
| 2245950 | 4/1975 | France | 324/175 |

*Primary Examiner*—David Smith, Jr.

*Attorney, Agent, or Firm*—John T. Meaney; Joseph D. Pannone

[57] ABSTRACT

A control system for rotating anode x-ray tubes comprising an x-ray tube including an anode rotated by a motor having mounted therein photoelectric means for sensing rotational movement of the anode, and circuit means electrically connected to the tube, the photoelectric means, and the motor for regulating operation of the tube and rotational speed of the motor in accordance with parameters selected for operation of the tube.

15 Claims, 6 Drawing Figures

X-RAY TUBE CONTROL SYSTEM

CROSS-REFERENCE TO RELATED APPLICATIONS

This is a division of application Ser. No. 847,877, filed Nov. 2, 1977, now U.S. Pat. No. 4,225,787.

BACKGROUND OF THE INVENTION

1. Field of the Invention

The invention relates generally to control systems for motor operated apparatus, and is concerned more particularly with a control system for efficiently rotating the anode of the x-ray tube at a speed commensurate with selected operating parameters of the tube.

2. Discussion of the Prior Art

A rotating anode x-ray tube may include a tubular envelope wherein an anode target disc is disposed transversely for rotation about its axial centerline. The target disc generally has a frusto-conical surface disposed adjacent an electron emitting cathode, which may be of the filamentary type, for example. The sloped outer peripheral portion of the frusto-conical anode surface constitutes a focal track having aligned with the cathode a focal spot area of constantly changing focal track material when the anode disc is rotating. The focal track includes material, such as tungsten, for example, suitable for readily emitting x-rays from the focal spot area in response to impinging electrons beamed from the cathode. The useful x-rays emitted from the sloped focal spot area pass in a beam through a radially aligned window in the tube envelope.

The anode target disc generally is rotated by a rotor of an AC induction motor axially disposed in an end portion of the envelope, which is encircled by an external stator of the motor. The x-ray tube and encircling stator usually are insulatingly supported in an x-ray shielded housing, which may be filled with a transparent dielectric coolant, such as oil, for example. The housing generally has an x-ray transparent port aligned with the window in the tube envelope to permit egress of the x-ray beam from the housing. Also, the housing usually is provided with a spaced pair of conventional horn-type connectors, whereby external sources of electrical energy connected through suitable control units are, in turn, connected to appropriate electrodes of the x-ray tube.

In operation, the cathode initially is heated electrically to a standby temperature, which generally is considerably less than the desired operating temperature of the cathode. Just prior to taking an x-ray exposure, the cathode is heated to an incandescent temperature sufficient to supply the desired electron current during a selected exposure interval. Simultaneously, the AC induction motor is electrically "boosted", or accelerated, to a speed sufficient to protect the material of the anode target disc from overheating during the exposure interval. Generally, a predetermined fixed time interval is allowed for the cathode to heat to the desired temperature and for the anode disc to accelerate to the required speed. When the fixed time interval has elapsed, a high voltage is applied between the cathode and the anode of the x-ray tube to electrostatically beam electrons emitted from the cathode onto the focal spot area of the anode with sufficient energy to generate x-rays, which radiate from the focal spot area in all directions. The useful portion of the x-rays pass in a beam through the x-ray transparent window in the tube envelope and egress from the aligned port in the housing.

However, only about one percent of the electron energy impinging on the focal spot area of the anode disc is converted into x-ray energy. The remaining ninety-nine percent of the electron energy is converted into heat which must be dissipated by the anode target disc. Consequently, the anode target is rotated at a speed sufficient to ensure that successive discrete areas of the focal track pass rapidly through the electron beam in order to prevent overheating which causes vaporization or cracking of the focal track material. However, the anode target speed should allow sufficient time for the successive discrete areas of the focal track to dissipate heat before being rotated through the electron beam again. Thus, the anode target should be rotated within an optimum speed range dependent on the operating parameters of the tube.

Generally, the fixed time delay commonly used to ensure the anode disc has attained the required speed has proved unsatisfactory because it does not take into account variations in the structure of the tube. Also, other prior art means for monitoring anode disc speed, such as vibration and acoustical sensing devices, for examples, may provide inaccurate measurements due to the effects of extranneous signals unrelated to the anode speed. Furthermore, prior art means for monitoring anode disc speed generally are used to measure restricted speed limits, such as 3000 RPM for fluoroscopy and 9000 RPM for radiography, for examples. Thus, these prior art measuring systems do not provide means for determining that the anode rotational speed is suitable for the operating power parameters selected for a particular x-ray exposure.

Therefore, it is necessary and desirable to provide a rotating anode tube with a control system having means for ensuring that the anode disc is rotating at a speed commensurate with selected operating parameters, and in a manner independent of ambient energy signals.

SUMMARY OF THE INVENTION

Accordingly, this invention provides a control system for a rotating anode x-ray tube including an evacuated envelope wherein an electron emitting cathode is disposed to beam electrons onto a focal spot area of an anode target, which is supported for rotation by an internal rotor of an AC induction motor having an external stator encircling the rotor. The rotor and stator of the motor are provided with reflective photoelectric means for sensing rotational movement of the anode and producing corresponding electrical output signals. The cathode and the anode of the x-ray tube are connected electrically to external electrical sources and a common control unit having means for selecting the operating parameters of the tube. The control unit, the output of the photoelectric means, and the stator of the induction motor are electrically connected to monitoring circuit means for determining a desired rotational speed of the anode disc in accordance with selected parametric signals received from the control unit, and for determining the actual rotational speed of the anode disc in accordance with signals received from the photoelectric means. The monitoring circuit means also is provided with means for comparing the desired rotational anode speed with the actual rotational anode speed to produce output signals suitable for regulating operation of the x-ray tube and of the induction motor.

The photoelectric means comprises an annular array of spaced reflective spots disposed circumferentially on the outer surface of the rotor and optically coupled to a light source and a photodetector. The light source and the photodetector may be disposed within respective angulated apertures in a pole piece of the stator to direct light from the source onto a discrete area of the array through which successive reflective spots thereof pass when the anode target is rotated by the rotor. Light from the source reflected by the spaced reflective spots of the array is directed to the photodetector for producing a train of electrical output pulses indicative of the rotational speed of the anode target. The light source is electrically connected to an external source of power, and the photodetector is electrically connected to an external monitoring circuit.

Alternatively, the light source and the photodetector may be disposed externally of an x-ray shielded housing enclosing the tube, and be optically coupled to the array of spaced reflective spots on the rotor by a bifurcated fiber optic light pipe having the common end thereof supported within an aperture in a pole piece of the stator. As another alternative, the light source disposed within an aperture in a pole piece of the stator may comprise an incandescent lamp and be connected in electrical series with the photodetector disposed within the other aperture in the pole piece of the stator. Thus a single conductor may electrically connect the lamp and the photodetector to a external circuit having means for alternately energizing the lamp and receiving the output pulses from the photodetector.

The output of the photodetector is electrically connected to a monitoring circuit which also is electrically connected to an x-ray control unit and to the stator windings of the AC induction motor. The x-ray control unit may be provided with digital or analog means for selecting the value of x-ray tube current and x-ray tube voltage used during a predetermined x-ray exposure interval. Also, the monitoring circuit may be provided with digital or analog means for determining the desired rotational speed of the anode target from input signals received from the x-ray control unit and for determining the actual rotational speed of the anode target from the train of input pulse signals received from the photodetector. The monitoring circuit also is provided with digital or analog means for comparing the desired anode rotational speed with the actual rotational speed and determining whether an x-ray exposure should be initiated, whether the induction motor should be accelerated or allowed to coast, and whether the desired rotational speed is an objectional resonant speed where excessive mechanical vibration occurs in the anode structure.

BRIEF DESCRIPTION OF THE DRAWINGS

For a better understanding of the invention, reference is made in the following detailed description to the drawings, wherein.

DESCRIPTION OF THE PREFERRED EMBODIMENTS

Figure 1:
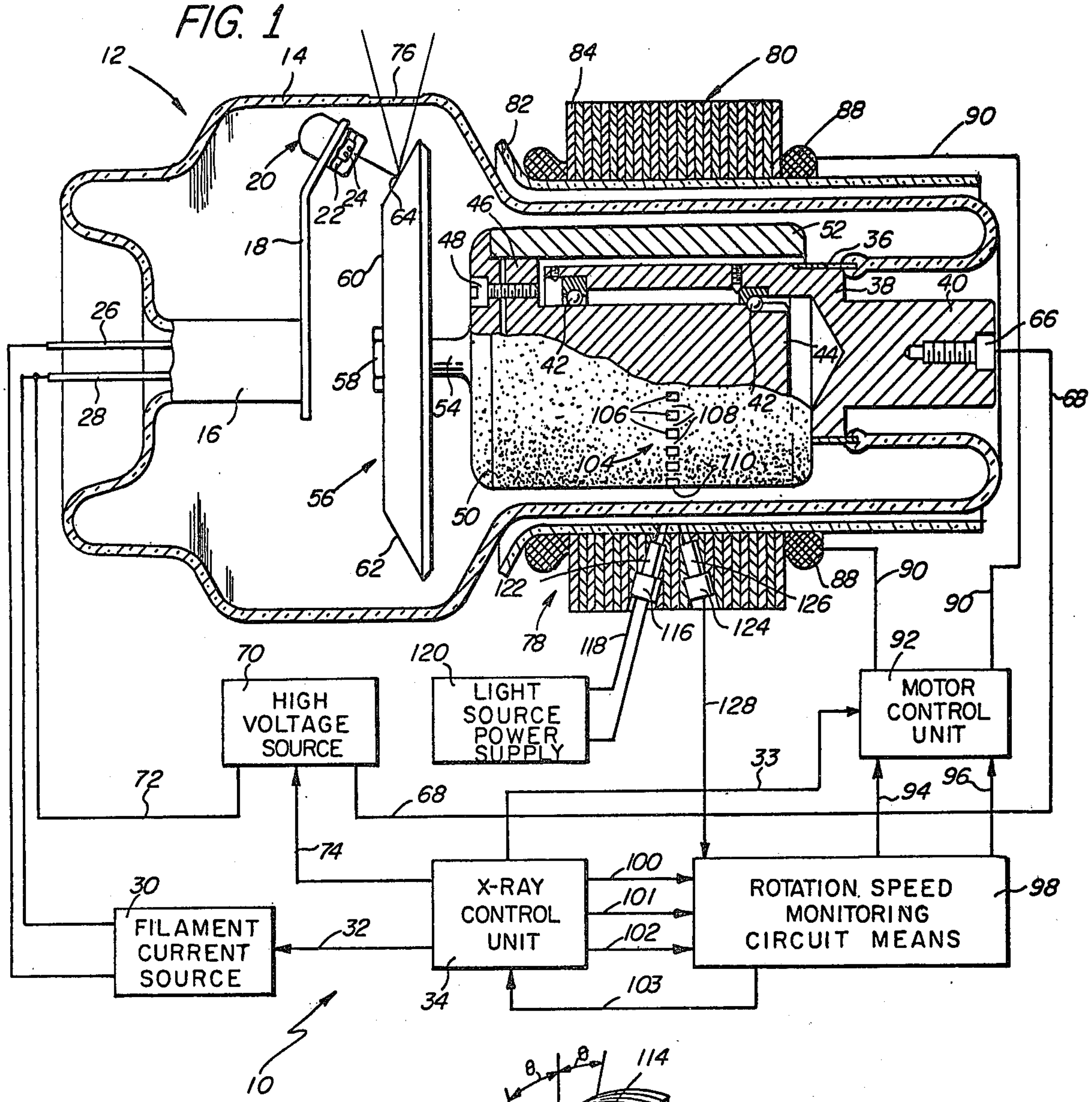
FIG. 1 is an axial view, partly in section, of a rotating anode x-ray tube embodied in a control system of this invention.

Referring to the drawings wherein like characters of reference designate like parts, there is shown in FIG. 1 a control system 10 embodying a rotating anode x-ray tube 12 having an evacuated tubular envelope 14 which may be made of dielectric vitreous material, such as lead-free glass, for example. The envelope 14 has a reentrant end portion peripherally sealed to one end of a cathode cylinder 16 which is closed at the other end by an hermetically attached, hollow arm 18. The arm 18 extends radially within envelope 14 and has an angulated end portion supporting a conventional cathode head 20. Cathode head 20 generally includes a stepped cathode cup 22 having suitably disposed therein an electron emitting filament 24. Terminal end portions of the filament 24 are electrically connected to respective conductors 26 and 28 which are routed through the hollow arm 18 and extend hermetically out of the envelope 14. Externally of envelope 14, the conductors 26 and 28 are electrically connected to respective terminals of a filament current source 30 which receives electrical signals, as by means of interconnecting electrical conductor 32, for example, from an x-ray control unit 34. Thus, the filament current source 30 may be energized, when desired, by an electrical signal command from the x-ray control unit 34 to heat the filament 24 to a predetermined electron emitting temperature.

Envelope 14 has an opposing reentrant end portion peripherally sealed, as by means of a Kovar collar 36, for example, to an outer cylindrical surface of a stationary housing 38. The housing 38 is made of conductive material, such as copper, for example, and has an adjacent closed end provided with an anode terminal stem 40, which extends externally of envelope 14. Rotatably supported, as by axially spaced bearings 42, for example, in housing 38 is a shaft 44 made of suitable conductive material, such as stainless steel, for example. Shaft 44 extends axially out of an opposing open end of housing 38 and terminates in an outwardly extending radial flange 46, which is spaced from the adjacent end of the housing. The flange 46 is fixedly attached, as by screws 48, for example, to a closed end of a cup-shaped rotor 50 which is made of conductive material, such as copper, for example, and has a wall portion 52 extended in spaced encircling relationship with the housing 38. Thus, the shaft 44 rotatably mounted within the stationary housing 38 supports the rotor 50 for rotation about the housing.

The closed end of rotor 50 is provided with a fixedly attached stem 54 which extends axially through a central portion of a transversely disposed anode disc 56 and is fixedly attached thereto, as by a nut 58 threadingly engaging a protruding end portion of stem 54, for example. Stem 54 preferably is made of a material, such as molybdenum, for example, which mechanically and electrically connects the anode disc 56 to the rotor 50 and provides a heat barrier for minimizing the conduction of heat from anode disc 56 to rotor 50. Adjacent the cathode head 20, the anode disc 56 may be provided with a generally frustoconical surface 60 having a sloped outer peripheral portion constituting an annular focal track 62. The focal track 62 has a focal spot area 64 thereof aligned with the electron emitting filament 24, and includes in its composition a material, such as tungsten, for example, which readily emits x-rays when bombarded with high energy electrons. Accordingly, the anode disc 56 is electrically connected through the described anode structure to anode terminal stem 40, which may be electrically connected, as by screw 66, for example, to an electrical conductor 68. The conductor 68 is electrically connected to a positive terminal of a high voltage source 70, which has a negative terminal electrically connected, as by respective interconnecting conductors 72 and 28, for example, to the filament 24 in cathode 20. The high voltage source 70 also receives electrical signals from the x-ray control unit 34, as by means of an interconnecting conductor 74, for example.

Thus, the high voltage source 70 may be energized by an electrical command signal from the x-ray control unit 34 to establish between the filament 24 and the anode disc 56 an electrostatic field of predetermined intensity. As a result, electrons emitted from the filament 24 will be beamed onto the focal spot area 64 of focal track 62 with sufficient energy to generate in the underlying focal track material x-rays which will radiate in all directions from the focal spot area. Accordingly, a useful portion of the x-rays, thus generated, will pass in a beam through an x-ray transparent window 76 in a portion of the envelope 14 radially aligned with the sloped focal spot area 64. However, only about one percent of the impinging electron energy is expended in the generation of x-rays. The other approximately ninety-nine percent of the electron energy is converted into heat, which must be dissipated to prevent damage to the focal track material in the focal spot area 64. Consequently, the transversely disposed anode disc 56 is rotated about its axial centerline, such that successive discrete areas of the focal track 64 pass sequentially through the electron beam. Thus, while a particular discrete area of the focal track is being bombarded by electrons for the generation of x-rays, the preceding discrete areas of the focal track 64 having passed through the electron beam can be dissipating the resulting heat generated therein before passing through the electron beam again.

Figure 2:
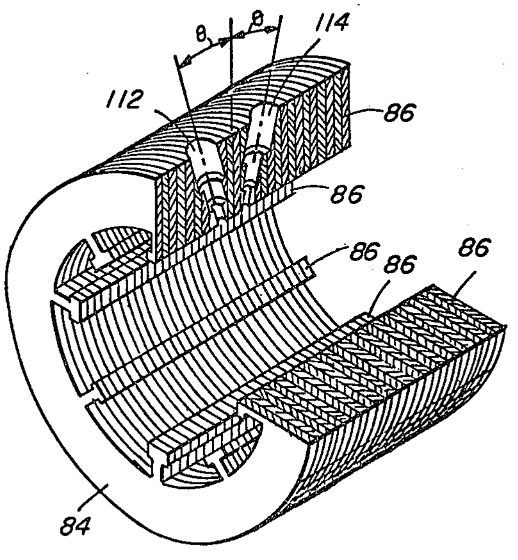
FIG. 2 is an isometric view, partly in section, of the stator core shown in FIG. 1.

The required rotation of anode disc 56 is provided by the attached rotor 50 which comprises the rotatable member of an alternating current induction motor 78 having a wire wound stator 80 disposed externally of envelope 14. The stator 80 may conveniently encircle a transparent sleeve 82 made of nonmagnetic material, such as glass, for example. Accordingly, the end portion of envelope 14 having rotor 50 therein may be inserted axially into sleeve 82 a sufficient distance for stator 80 to encircle the rotor. As shown more clearly in FIG. 2, the stator 80 may include a laminated core 84 of stacked rings made of suitable magnetic material, such as silicon steel, for example, and having an inwardly projecting array of annularly spaced pole pieces 86 which extend longitudinally of the core. The stator 80 also includes a plurality of interconnected coils 88 wound around the pole pieces 86 and electrically connected, as by conductors 90, for example, to a motor control unit 92. In accordance with a command signal received from x-ray control unit 34 via an interconnecting conductor 33, the motor control unit 92 sends a predetermined electrical current flowing through the coils 88 to establish within stator 80 a rotating magnetic field. This field exerts sufficient torque on the rotor 50 to rotate the attached anode disc 56 at a rotational speed dependent on the frequency and amplitude of the current flowing through the coils 88 of stator 80. The motor control unit 92 receives electrical "boost" and "run" signals, as by means of respective conductors 94 and 96, for example, from a rotational speed monitoring circuit means 98.

During the fabrication of x-ray tube 12, the outer cylindrical surface of rotor 50 is polished, as by buffing, for example, and then masked prior to applying, as by spraying, for example, a coating of light absorbent material, such as black chromate, for example. Consequently, after the mask is removed, the coating of light absorbent material sharply defines a circumferential array 104 of brightly polished spots 106, which are annularly spaced apart by interposed areas 108 of the coating. As a result, when the rotor 50 is rotating anode target disc 56, the array 104 provides a continuous series of alternate light reflective spots 106 and light absorbent areas 108 sequentially passing a radially aligned, region 110 of the envelope 14. Accordingly, the number of light reflective spots 106 passing the reference region 110 during a fixed time interval provides an accurate determination of the rotational speed of anode disc 56. Thus, the multiple spots 106 in array 104 provide means for obtaining a more accurate measurement of anode rotational speed and in a shorter time interval than anode speed measuring means of the prior art limited to sensing only complete revolutions of the anode disc.

Referring again to FIG. 2, the stator core 84 of stator 80 is provided, as by drilling, for example, with an angularly disposed pair of longitudinally spaced apertures 112 and 114, respectively. The apertures 112 and 114 extend from the outer cylindrical surface of core 84 and entirely through a common pole piece 86 of the stator 80. Each of the respective apertures 112 and 114 is provided with a small diameter end portion adjacent the inner surface of pole piece 86, a larger diameter end portion adjacent the outer surface of core 84, and an intermediate diameter portion therebetween. As shown in FIG. 1, a light source 116, such as a light emitting diode, for example, is disposed within the larger diameter end portion of aperture 112 and is electrically connected, as by conductors 118, for example, to a power supply 120. The power supply 120 comprises an independently controlled source of electrical power for energizing the light source 116 when desired. Light source 116 is optically coupled through a fiber optic light pipe 122 in the intermediate diameter portion of aperture 112 to the smaller diameter end portion thereof. The smaller diameter end of aperture 112 is positioned to direct light from the source 116 through the reference region 110 of envelope 14 and onto an aligned area of the array 104.

Similarly, a photosensitive device 124, such as a photodiode, for example, is disposed within the larger diameter end portion of aperture 114 and is optically coupled to the smaller diameter end portion thereof through a fiber optic light pipe 126 disposed in the intermediate diameter portion. The apertures 112 and 114 are angularly disposed with respect to one another such that the respective axial centerlines thereof, when extended through the reference region 110 of envelope 14, converge on the aligned area of array 104 receiving light from the source 116. Consequently, when the rotor 50 is rotating anode disc 56, the spots 106 passing sequentially through the area of array 104 aligned with region 110 reflect light into the small diameter end portion of aperture 114. The resulting pulses of light entering aperture 114 are transmitted through the light pipe 126 to impinge on the photosensitive device 124 to produce a corresponding train of electrical output pulses. These electrical output pulses, which are indicative of the anode disc rotational speed are sent, as by means of conductor 128, for example, to the rotation speed monitoring circuit 98.

Thus, the annular array 104 of spaced reflective spots 106 on rotor 50 in conjunction with the light source 116 and photodiode 124 disposed within stator 80 constitute a photoelectric means incorporated or built into motor 78 for sensing rotational travel of anode disc 56. The material of stator core 84 shields the light source 116 and the photosensitive device 124 from any x-rays in the anode end portion of envelope 14, where the x-radiation level is relatively low. Also, the material of core 84 and the anode disc 56 shields the photosensitive device 124 from the incandescent glow of filament 24. The small diameter end portions of the apertures 112 and 114 focus the light source 116 and the photodiode 124 precisely on a common array 104, thereby minimizing the effects of ambient or other extraneous radiation. Accordingly, the described photoelectric system provides means for measuring the actual rotational speed of the anode disc 56 independently of degrading factors, such as wear of the bearings 42, distortions due to overheating, fluctuations in current supplied to the coils 88 of stator 80, and the like.

Moreover, the multiple reflective spots 106 in array 104 provide means for measuring not only complete revolutions of anode disc 56 but also fractional portions thereof, and in a relatively short time interval, such as one-tenth of a second, for example, as compared to prior art systems. This relatively short measuring time interval aids in prolonging the useful life of filament 22 which is electrically "boosted" to a desired electron emitting temperature while the rotational speed of the anode disc 56 is being measured to determine when a selected high voltage can be safely applied between the filament 24 and anode disc 56 for taking an x-ray exposure. Accordingly, the rotational speed monitoring circuit means 98 is provided with electronic means for counting the electrical pulses received from the photosensitive device 124 during a correspondingly short timed interval and producing an electrical signal indicative of the rotational speed of anode disc 56.

The rotational speed monitoring circuit 98 also receives, as by means of respective conductors 100, 101, and 102, for example, from x-ray control unit 34 electrical signals indicative of selected values for tube current, exposure time interval, and tube voltage, respectively. With these signals received from x-ray control unit 34, the monitoring circuit means is enabled to determine an optimum anode speed range wherein discrete areas of the focal track 64 remain in the focal spot area 62 a sufficient time interval for generating x-rays without damaging the underlying focal track material. Also, the optimum anode speed range allows discrete areas of the focal track 64 to dissipate heat and achieve a safe temperature level before returning to the focal spot area 62. By comparing the actual rotational speed of anode disc 56 with a mnimum value for the desired speed range, the monitoring circuit 98 is enabled to determine when an electrical signal may be sent, as by means of interlocking conductor 103, for example, to the x-ray control unit 34 for permitting the selected high voltage to be applied between filament 24 and anode disc 56.

Figure 3:
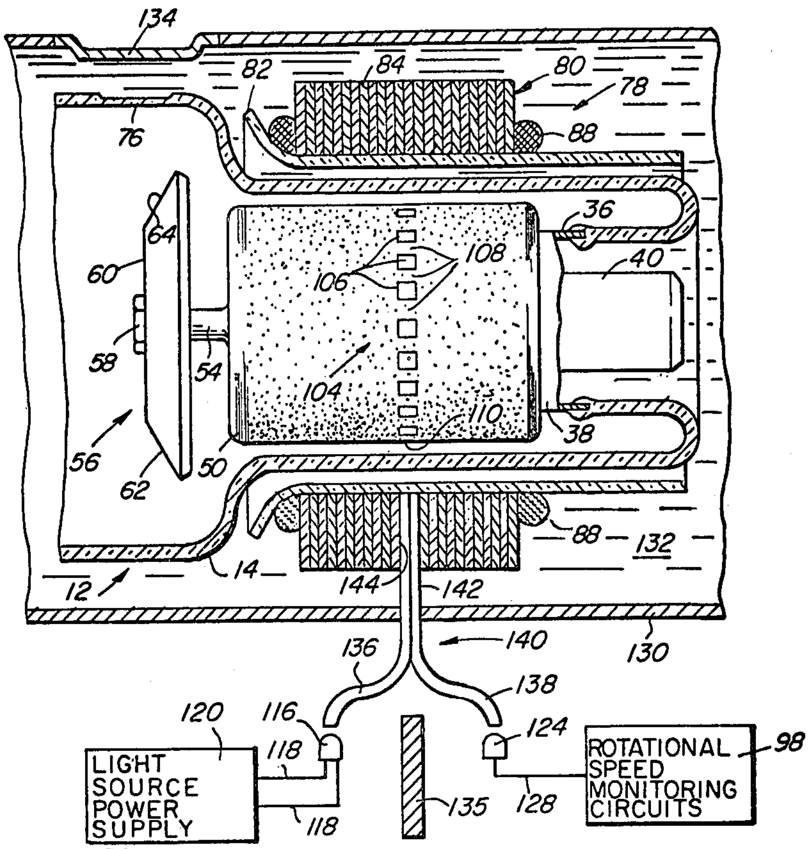
FIG. 3 is an alternative embodiment of the photoelectric means shown in FIG. 1.

As shown in FIG. 3, the tube 12 may be insulatingly supported within a conventional x-ray generator housing 130, which may be filled with a transparent dielectric coolant 132, such as oil, for example. The housing 130 includes an x-ray transparent port 134 which is radially aligned with the window 76 in envelope 14 to permit egress of an x-ray beam (not shown) emanating from the focal spot area 64. Housing 130 also may be provided with a conventional pair of horn-type electrical connectors (not shown) for making electrical connections through the wall of housing 130 to the electrodes of tube 12 and the stator coils 88 of motor 78. However, in order to reduce the number of conductors feeding through the horn-type electrical connectors, the light source 116 and the photosensitive device 124 may be located externally of the oil-filled housing 130. If necessary, an opaque barrier means 135 may be disposed between the light source 116 and the photosensitive device 124 to shield the device 124 from the source 116. The light source 116 and the photosensitive 124 may be optically aligned with terminal ends of respective fiber optic bundles 136 and 138 which interleave to form a common leg 142 of a bifurcated light pipe 140. Thus, the common leg 142 comprises a unitary light conductor which may be routed into the housing 130 by any convenient means, such as sealed through the wall of housing 130 in a fluid-tight manner, for example.

Within housing 130, the common leg 142 of light pipe 140 may be threaded through an aperture 144, which extends from the outer cylindrical surface of core 84 and radially through a stator pole piece thereof. The aperture 144 is radially aligned with the reference region 110 of envelope 14 such that the terminal end of common leg 142 is disposed in spaced opposing relationship with the area of array 104 aligned with the region 110. As a result, light from source 116 is conducted through bundle 136 to be directed onto the area of array 104 aligned with region 110 of envelope 14. Consequently, when the rotor 50 is rotating anode disc 56, the reflective spots 106 passing region 110 reflect respective pulses of light through the optic bundle 138 to the photosensitive device 124. Thus, the photosensitive device 124 produces a train of corresponding electrical pulse signals having a frequency indicative of the rotational movement of anode disc 56. The train of electrical output pulses from photosensitive device 124 is sent, as previously described, through the conductor 128 to the rotational speed monitoring circuit means 98.

Figure 4:
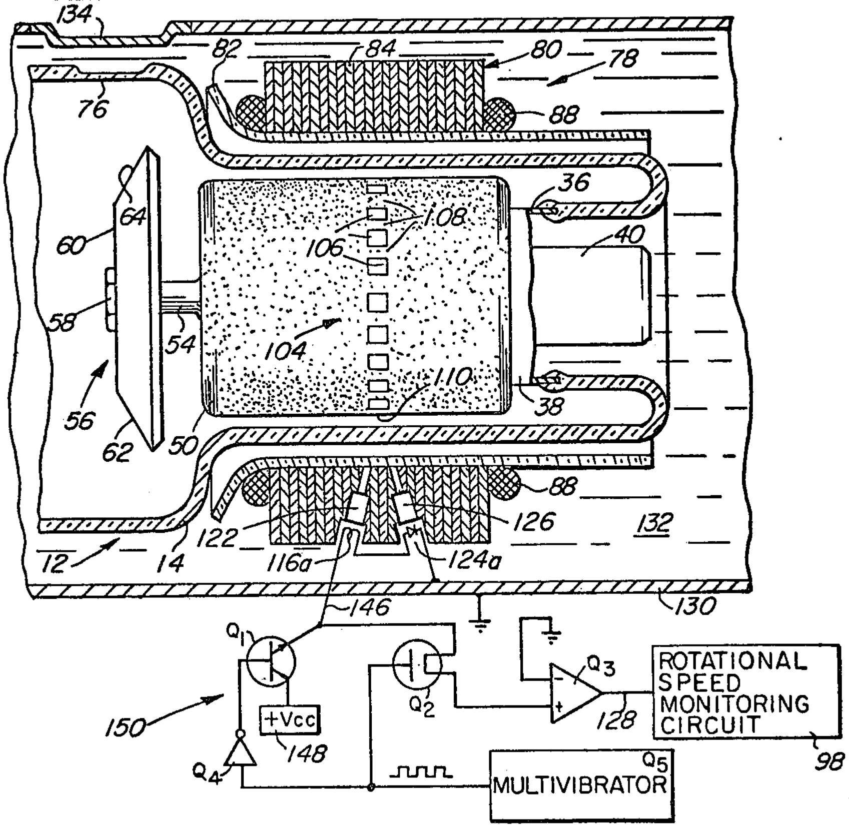
FIG. 4 is another alternative embodiment of the photoelectric means shown in FIG. 1.

Alternatively, as shown in FIG. 4, the light source 116 in aperture 112 may comprise an incandescent lamp 116*a;* and the photosensitive device 124 in aperture 114 may comprise a photodiode 124*a.* The photodiode has its cathode connected to electrical ground through the housing 130, and its anode connected through the filament of lamp 116*a* to a single electrical conductor 146 which is routed out of the housing by any convenient means, such as one of the conventional horn-type connectors (not shown), for example. Externally of the housing 130, the conductor 146 is connected to the emitter electrode of a transistor $Q_1$, which has its collector electrode connected to a positive voltage source 148. The conductor 146 also is connected to the source electrode of a field effect transistor $Q_2$, which has its drain electrode connected to a positive input terminal of an operational amplifier $Q_3$. The amplifier $Q_3$ has its negative input terminal connected through the grounded housing 130 to the cathode of photodiode 124*a,* and its output connected to the rotational speed monitoring circuit 98.

A multivibrator $Q_5$, which produces a train of electrical square wave output pulses, has its output connected to the gate electrode of field effect transistor $Q_2$, and through an inverter $Q_4$ to the bass electrode of transistor $Q_1$. Consequently, when the output of multivibrator $Q_5$ is Low, the field effect transistor $Q_2$ is rendered nonconductive; and the inverter $Q_4$ renders transistor $Q_1$ conductive. As a result, a current flows through the lamp 116*a* and forward biased photodiode 124*a* to electrical ground. Accordingly, the lamp 116*a* is illuminated; but the photodiode 124 is insensitive to the light reflected from spots 106 passing reference region 110 of envelope 14. On the other hand, when the output of multivibrator $Q_5$ is High, the field-effect transistor $Q_2$ is rendered conductive; and the transistor $Q_1$ is rendered non-conductive by the inverter $Q_4$. However, due to the thermal lag of the glowing filament in lamp 116*a,* light is still reflected from the spots 106 passing region 110 to the now reverse-biased photodiode 124*a*. As a result, the photodiode produces a train of electrical output pulses indicative of the rotational movement of anode disc 56 during a fixed time interval. The train of output pulses produced by photodiode 124*a* flows through the filament of lamp 116*a* and the field-effect transistor $Q_2$ to the positive terminal of amplifier $Q_3$, which has its negative input terminal connected to the cathode of photodiode 124*a*. Consequently, the amplifier $Q_3$ produces a corresponding train of amplified electrical output pulses, which pass through the conductor 128 to the rotational speed monitoring circuit means 98. Thus externally of the housing 130, the single conductor 146 is connected to a dual-function circuit means 150 for alternately illuminating lamp 116*a* and then using the thermal lag thereof to sense rotational movement of anode disc 56 during fixed time intervals.

Figure 5:
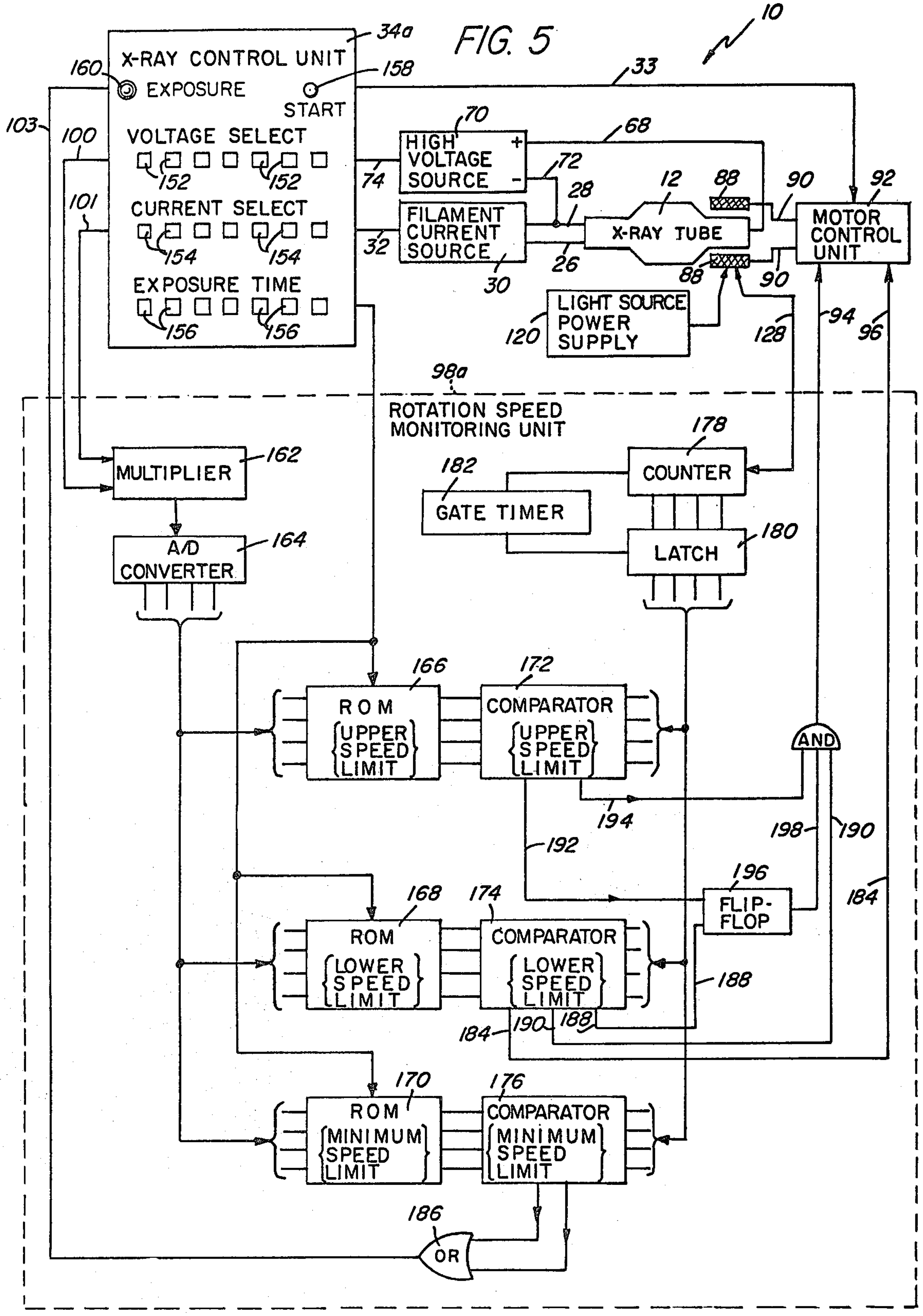
FIG. 5 is a digital embodiment of the x-ray control unit and monitoring circuit shown in FIG. 1.

As shown in FIG. 5, the system 10 may include a digitally operated x-ray control unit 34*a* having switch means for selecting parametric operating values for the x-ray tube 12. The unit 34*a* is provided with a plurality of push buttons 152 for selecting a specific voltage to be applied between the cathode filament 24 and the anode disc 56 when an x-ray exposure is initiated. Unit 34*a* also is provided with a plurality of push-buttons 154 for selecting a specific electron current to be beamed from the cathode filament 24 onto the focal spot area 64 of anode disc 56 by the selected voltage applied therebetween. Also, the x-ray control unit 34*a* is provided with a plurality of push-buttons 156 for selecting an exposure time interval during which the selected voltage is applied between the cathode filament 24 and the anode disc 56 of x-ray tube 12.

After the voltage, current, and exposure time parameters are selected, a "Start" push-button 158 may be actuated to send suitable electrical signals through conductor 32 to the filament current source 30, and through conductor 33 to the motor control unit 92. As a result, an increase in current flow from the filament current source 30 flows through the filament 24 to heat it from its standby temperature to a predetermined electron emitting temperature. Also, the motor control unit 92 sends an electrical current through the stator coils 88 of motor 78 for establishing within stator 80 a proportionate rotating magnetic field to accelerate rotor 50 and attached anode disc 56 to a corresponding rotational speed. However, an electrical signal is not sent from the x-ray control unit 34 through conductor 74 for activating high voltage source 70 to apply the selected value of voltage between filament 24 and anode disc 56, until an exposure interlock condition is removed by a suitable electric signal sent from the rotation speed monitoring circuit 98 through conductor 103 to an "Exposure" ready light 160 in the x-ray control unit 34.

Also, when the parametric operating values are selected, the x-ray control unit 34 sends corresponding voltage, current, and exposure time, electrical signals through respective conductors 100, 101, and 102 to a digitally operated, speed monitoring circuit 98*a*. In circuit 98*a*, the conductors 100 and 101 are connected to respective input terminals of a multiplier device 162 which multiplies the received voltage and current signals to produce an output signal corresponding to the power loading of the focal spot area 64 on anode disc 56. The output of multiplier device 162 is connected to the input of an analog-to-digital (A/D) converter 164, which receives the power loading signal and produces a corresponding digitized output signal having an appropriate number of bits, such as four, for example, for feeding a preprogrammed read-only-memory (ROM) means. The ROM means is preprogrammed to match the received digitized power loading signal with an optimum anode speed range, which may be conveniently based on the principle that an increase in power loading is proportional to the square root of the required increase in anode rotational speed. The ROM means also may be preprogrammed to avoid mechanical resonant speeds where excessive vibration may occur, and instead match the power loading signal with the closest allowable value of anode rotational speed where excessive vibration does not occur.

The output of the A/D converter 164 is connected to input terminals of an upper speed limit ROM device 166, a lower speed limit ROM device 168, and a minimum threshold speed ROM device 170, respectively. The conductor 102 carrying the selected exposure time electrical signal also is connected to input terminals of the ROM devices 166, 168, and 170, respectively. The ROM device 166 produces a digital output signal having an appropriate number of data bits, such as four, for example, which are fed to respective input terminals of an upper speed limit comparator 172. Similarly, the ROM device 168 produces a digital output signal having an appropriate number of data bits, such as four, for example, which are fed to respective input terminals of a lower speed limit comparator 174. Also, the ROM device 170 produces a digital output signal having an appropriate number of data bits which are fed to respective input terminals of a minimum threshold speed comparator 176.

The output signal produced by the ROM device 166 may be indicative of a maximum anode speed which allows successive discrete areas of the focal track 64 to dissipate sufficient heat for reducing to a safe temperature value before returning to the focal spot 62. Also, the output signal produced by the ROM device 166 may be indicative of a maximum anode speed beyond which the required current flowing through stator coils 88 would add excessively to the heat within housing 130. Similarly, the output signal produced by the ROM device 168 is indicative of a lower anode speed limit below which an electrical "boost" signal should be sent to the motor control unit 92 for accelerating the anode disc 56 to the maximum speed limit within the desired range. Also, the ROM device 170 produces an output signal indicative of a minimum anode speed limit below which damage to the material of focal track 64 may occur.

As noted previously, the output of photosensitive device 124 is connected through conductor 128 to the rotation speed monitoring circuit 98*a*, wherein it is connected to the input of a counter 178. The counter 178 has its output connected through a latch device 180 to input terminals of the comparators 172, 174, and 176, respectively. A gate timer 182 connected between the counter 178 and latch device 180 activates the counter 178 to start counting the electrical pulse signals received from photosensitive device 124 indicative of rotational movement of anode disc 156. As a result, the counter 178 sends to the latch device 180 an accumulative count digital signal having an appropriate number of data bits, such as four, for example. After a predetermined interval of time, such as one-tenth of a second, for example, the gate timer 182 terminates the counting process by resetting the counter to zero for starting another counting sequence. Simultaneously, the gate timer 182 activates latch device 180 to send the accumulated count digital signal indicative of actual rotational speed of anode disc 56 to the respective comparators 172, 174, and 176. Accordingly, the comparators 172, 174, and 176 are enabled to compare the actual rotational speed of anode disc 56 with the respective anode rotational speed limits received from the connected ROM devices.

In operation, when the actual rotational speed of anode disc 56 is less than the lower speed limit set by ROM 168, the comparator 174 produces a "boost" acceleration signal on an output conductor 184 which is connected through conductor 96 to the motor control unit 92. As a result, the motor control unit 92 sends a relatively high value of current through stator coils 88 to accelerate the anode disc 56 rapidly to the disired speed range. When the actual rotational speed of anode disc 56 is equal to or greater than the threshold speed limit set by ROM 170, the comparator 176 produces an output electrical signal which causes a connected Or gate 186 to send an electrical signal through conductor 103 and illuminate the "Exposure" ready lamp 160 in x-ray control unit 34*a*. Accordingly, the high voltage source 70 may be manually or automatically activated to apply the selected value of high voltage between the filament 24 and anode disc 56 for initiating an x-ray exposure.

When the actual rotational speed of anode disc 56 is equal to the lower speed limit set by ROM 168, the comparator 174 produces a Low signal on output conductor 184 and High output signal on output conductors 188 and 190, respectively. Since the actual rotational speed of anode disc 56 is less than the upper limit set by ROM 166, the comparator 172 produces a Low output signal on an output conductor 192 and High output signal on an output conductor 194. Consequently, a flip-flop device 196 having its "set" input terminal connected to conductor 188 and its "reset" input terminal connected to conductor 192 produces a High output signal, which is applied through a conductor 198 to an input terminal of an AND gate 200. Respective input terminals of AND gate 200 are connected to conductors 190 and 194 which carry respective High output signals. Accordingly, the AND gate 200 applies a High signal through output conductor 94 to an input terminal of motor control unit 92, which now has a Low signal applied through conductor 96 to its other input terminal. As a result, the motor control unit 92 reduces the level of current flowing through the stator coils 88 to a relatively low value which causes the anode disc 56 to rotate at a more normal running speed. Thus, by having the anode disc 56 run at a rotational speed within an optimum speed range commensurate with the power loading of the focal spot 64, the digitally operated, speed monitoring circuit 98*a* aids in conserving power and minimizing the heating effect of the current required to flow through the stator coils 88.

When the actual rotational speed of anode disc 56 exceeds the maximum value set by ROM 166, the comparator 172 produces a Low signal on output conductor 194 and a High signal on output conductor 192. As a result, the flip-flop 196 is reset to produce a Low signal on its output conductor 198. Accordingly, the AND gate 200 applies a Low output signal through output conductor 94 to the connected input terminal of motor control unit 92. Accordingly, the motor control unit 92 cuts-off the flow of current through the stator coils 88, and allows the anode disc 56 to coast. When the rotational speed of anode disc 56 is equal to the lower limit set by ROM 168, the comparator 174 produces a High signal on output conductors 188 and 190. Consequently, the flip-flop 196 is set to apply a High output signal through conductor 198 to the connected input terminal of AND gate 200. Also, since the actual rotational speed of anode disc 56 is less than the maximum value set by ROM 166, the comparator produces a Low signal on output conductor 192 and a High signal on output conductor 194. Consequently, the AND gate 200 applies a High output signal through conductor 94 to cause the motor control unit 92 to send a relatively low current through stator coils 88 and maintain anode disc 56 at a normal running speed.

Figure 6:
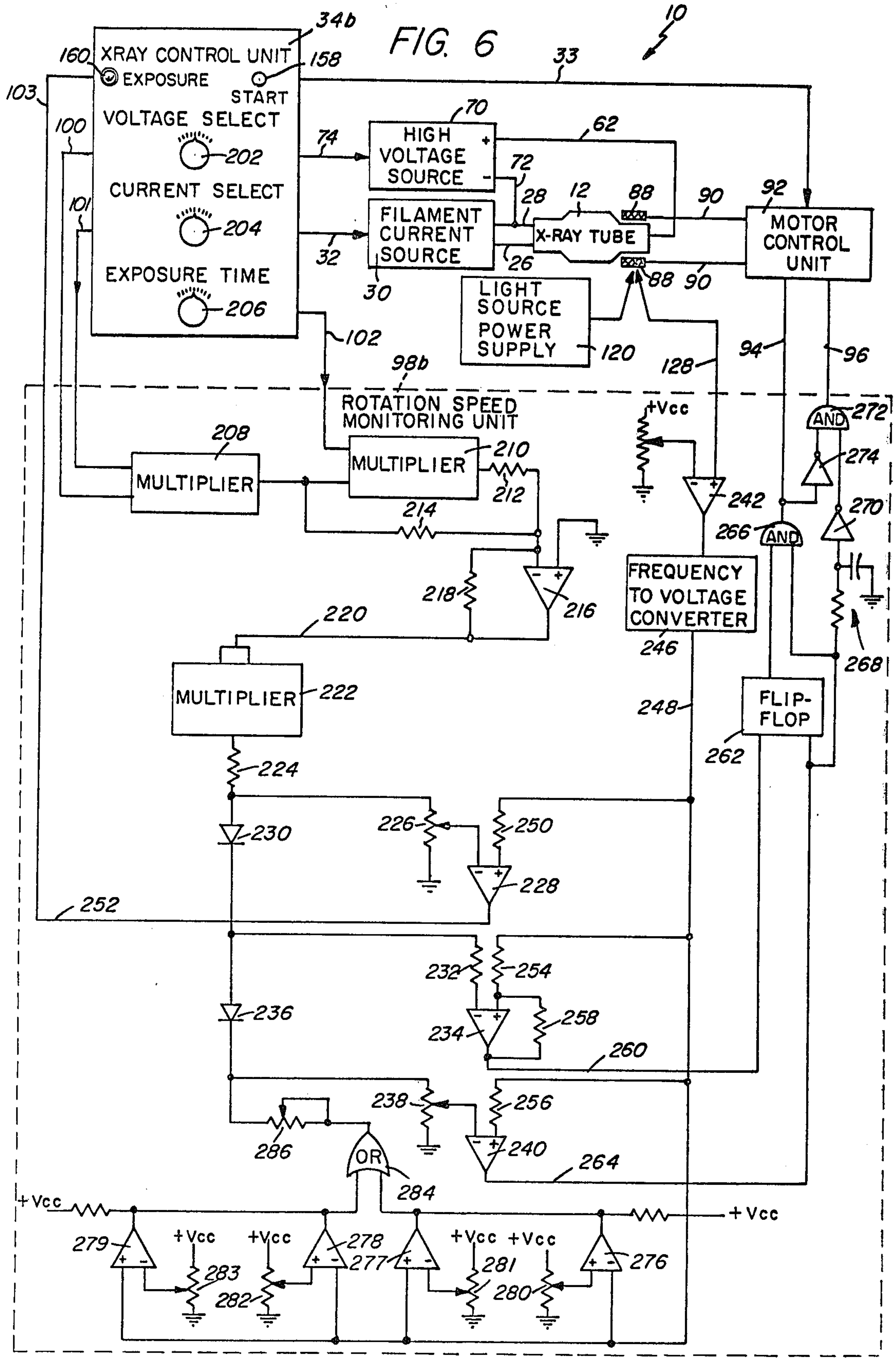
FIG. 6 is an analog embodiment of the x-ray control unit and monitoring circuit shown in FIG. 1.

Alternatively, as shown in FIG. 6, the system 10 may include an analog operated, x-ray control unit 34*b* having variable control means for selecting parametric values for the x-ray tube 12. The unit 34*b* is provided with a variable resistive device 202 for selecting a value of voltage to be applied between the cathode filament 24 and the anode disc 56 when an x-ray exposure is initiated. Unit 34*b* also is provided with a variable resistive device 204 for selecting a value of electron current to be beamed from the filament 24 to the focal spot area 46 of anode disc 56 during the x-ray exposure interval. Also, the unit 34*b* is provided with an adjustable timer device 206 which produces an electrical output signal corresponding to a selected exposure time interval.

When the voltage, current, and exposure interval values are selected, the x-ray control unit 34*b* sends corresponding electrical signals through respective conductors 100, 101, and 102 to an analog operated, speed monitoring circuit 98*b*. In circuit 98*b*, the conductors 100 and 101 are connected to respective input terminals of a multiplier device 208, wherein the received voltage and current signals are multiplied to produce and electrical output signal corresponding to the energy of electrons impinging on the focal spot area 64. The output of multiplier device 208 is connected to an input terminal of a second multiplier device 210, which has another input terminal connected to conductor 102 from x-ray control unit 34*b*.

Consequently, the second multiplier device 210 produces an output electrical signal which passes through a load resistor 212 and is summed with the electrical output signal from multiplier device 208 passed through a resistor 214. The resultant electrical signal, which corresponds to the power loading of focal spot area 64, is fed to a negative input terminal of an amplifier 216 having a positive input terminal connected to electrical ground. The output of amplifier 216 is connected through a feedback resistor 218 to its negative input terminal, and also is connected through a conductor 220 to dual input terminals of a third multiplier device 222. As a result, the amplifier 216 produces an amplified power loading signal which is squared in the multiplier device 222 and fed through an output load resistor 224. Thus, the electrical signal produced by the multiplier device 222 is proportional to a desired rotational speed for anode disc 56 and serves as a reference for determining the limits of a desired anode speed range.

Accordingly, the load resistor 224 is connected through an adjustable resistor 226 to a negative input terminal of a minimum speed comparator 228. The load resistor 224 also is connected to the anode of a diode 230 having its cathode connected through a resistor 232 to the negative input terminal of an upper speed limit comparator 234. Also, the load resistor 224 is connected through diode 230 to the anode of a second diode 236 having its cathode connected through an adjustable resistor 238 to the negative input terminal of a lower speed limit comparator 240. Thus, the adjustable resistor 226 determines the minimum desired speed limit for rotating anode disc 56 to attain before an x-ray exposure can be initiated. Also, the adjustable resistor 238 and the resistor 232 determine the lower and upper speed limits, respectively, of a desired anode speed range commensurate with the power loading parameters selected by means of x-ray control unit 34*b*.

The train of electrical pulse signals produced by photosensitive device 124 corresponds to the actual rotational movement of anode disc 56 and is sent through conductor 128 to the rotation speed monitoring circuit 98*b*. In circuit 98*b*, the conductor 128 is connected to a positive input terminal of a comparator 242, having a negative output terminal connected to an adjustable resistor 244 which determines the output signal level of the comparator 242. Accordingly, comparator 242 produces an output train of electrical signals corresponding to the actual rotational movement of anode disc 56 and feeds it into a frequency-to-voltage converter 246. As a result, the frequency-to-voltage converter 246 produces an output electrical signal corresponding to the actual rotational speed of anode disc 56, and applies it to an output conductor 248.

The output conductor 248 is electrically connected through an input resistor 250 to a positive input terminal of minimum speed comparator 228, which as an output conductor 252 connected through conductor 103 to the "Exposure" ready lamp 160 in x-ray control unit 34*b*. Thus, when actual rotational speed of anode disc 56 is greater than the desired minimum speed value applied to the negative input terminal of comparator 228, the comparator 228 produces a High output signal which illuminates the "Exposure" ready lamp 160. Consequently, the high voltage source 70 may be automatically or manually activated to apply the voltage value selected by device 202 of x-ray control unit 34*b* between the cathode filament 24 and the anode disc 56 to initiate an x-ray exposure, as previously described.

The output conductor 248 also is connected through a resistor 254 to a positive input terminal of upper speed limit comparator 234, and through a resistor 256 to a positive input terminal of lower speed limit comparator 240. The output of comparator 234 is connected through a feedback resistor 258 to its positive input terminal, and also is connected through a conductor 260 to a "Reset" input terminal of a flip-flop 262, which has its "Set" input terminal connected through a conductor 264 to the output of comparator 240. The output conductor 264 also is connected to an input terminal of an AND gate 266 which has another input terminal connected to the output of flip-flop 262. Also, the output conductor of comparator 240 is connected through a resistor-capacitor network 268 to electrical ground, and through an inverter 270 to an input terminal of a second AND gate 272. Another input terminal of AND gate 272 is connected through an inverter 274 to the output of AND gate 266, which also is connected to the "run" conductor 94 of motor control unit 92. The output of AND gate 272 is connected to the "boost" conductor 96 of motor control unit 92.

Thus, when the actual rotational speed of anode disc 56 is less than the desired lower speed limit value applied to the negative input terminal of comparator 240, an electrical "boost" or Low signal is sent through the output conductor 264 to accelerate the rotational speed of anode disc 56 rapidly into the desired speed range. The Low signal applied to conductor 264 passes through the resistor of network 268 and is inverted to a High signal by the inverter 270. The Low signal on conductor 264 also is applied to the connected input terminal of AND gate 266 to cause it to produce a Low output signal which is inverted to a High signal by the inverter 274 and applied to the other input terminal of AND gate 272. Consequently, with High signals applied to both of its input terminals, the AND gate 272 produces a High output signal which activates the motor control unit 92 to send a strong "boost" current through the stator coils 88. As a result, the anode disc 56 is rapidly accelerated into the desired speed range defined by the desired lower and higher speed limits applied to the negative input terminals of comparators 240 and 234, respectively.

When the actual rotational speed of anode disc 56 is greater than the desired lower speed limit value applied to its negative input terminal, the comparator 240 produces a High output signal on output conductor 264 and sets the flip-flop 262 to produce a High output signal. Consequently, with High signals applied to both of its input terminals, the AND gate 266 produces a High output signal which is inverted to a Low signal by inverter 274 and applied to the connected input terminal of AND gate 272. As a result, the motor control unit receives a Low signal on the "boost" conductor 96 and a High input signal on the "run" conductor 94. Consequently, the motor control unit 92 is activated to reduce the current flowing through stator coils 88 which causes the anode disc 56 to rotate at a more economical running speed and minimizes the heating effect of coils 88 in housing 130.

When the actual rotational speed of anode disc 56 is greater than the desired upper speed limit value applied to the negative input terminal of comparator 234, there is applied to the output conductor 260 thereof a High signal. As a result, the flip-flop 262 is reset to produce a Low output signal which is applied to the connected input terminal of AND gate 266 and causes it to produce a Low output signal. This Low output signal is inverted to a High input signal by the inverter 274 and applied to the connected input terminal of AND gate 272. However, with a Low signal on its other input terminal, the AND gate 272 produces a Low output signal which is applied to the input conductor of motor control unit 92. Consequently, with Low signals applied to both of its input conductors 94 and 96, respectively, the motor control unit 92 is de-activated and the anode disc 56 is allowed to coast within the desired speed range, thereby further conserving power and minimizing the heating effect of stator coils 88 within housing 130.

The output conductor 248 also is connected to negative input terminals of respective comparators 276 and 278, and also is connected to positive input terminals of respective comparators 277 and 279. The other terminals of comparators 276–279 are connected to the wiper arms of adjustable resistors 280–283, respectively, which are set to predetermined limiting values of resonant speed ranges. Thus, the comparators 276 and 277 constitute a logic window defined by the upper and lower limits respectively, of a speed range, such as 4000–4500 revolutions per minute, for example, where excessive mechanical vibrations normally occur. Similarly, the comparators 278 and 279 constitute another logic window defined by the upper and lower limits, respectively, of a speed range, such as 7000–8000 revolutions per minute, for example, where excessive mechanical vibrations also occur.

The output of each logic window is resistively connected to a positive voltage source and also to respective input terminal of an OR gate 284. The output of OR gate 284 is connected through an adjustable resistor 286 and a summing junction with the cathode of diode 236 to the adjustable input resistor 238 connected to the negative input terminal of comparator 240. Consequently, when the actual rotational speed of anode disc 56 is within one of the resonant speed ranges, the OR gate 284 produces a High output signal, which is modified by adjustable resistor 286. This modified signal voltage is added to the desired lower speed limit voltage applied through adjustable resistor 238 to the negative input terminal of comparator 240. As a result, the anode disc 56 is accelerated to next highest rotational speed value where excessive mechanical vibration does not occur. Thus, the analog operated, speed monitoring circuit 98*b* is provided with means for avoiding anode resonant speed ranges, which means was provided in the programming of the ROM devices 166, 168, and 170 respectively, of the digitally operated, speed monitoring circuit 98*a* shown in FIG. 5.

Thus, there has been disclosed herein a control system including an x-ray tube having an anode rotated by a motor wherein reflective photoelectric means is disposed for sensing rotational movement of the anode, and including circuit means connected to electrodes of the tube, the photoelectric means, and the motor for rotating the anode of the x-ray tube efficiently at a speed commensurate with selected operating parameters of the tube.

From the foregoing, it will be apparent that all of the objectives of this invention have been achieved by the structures shown and described herein. It also will be apparent, however, that various changes may be made by those skilled in the art without departing from the spirit of the invention as expressed in the appended claims. It is to be understood, therefore, that all matter shown and described herein is to be interpreted as illustrative and not in a limiting sense.

What is claimed is:

1. A rotational speed control system including:

an electric motor comprised of a cylindrical rotor disposed within a hollow cylindrical stator;

motor control means electrically connected to the stator for sending an electrical current therethrough and producing a corresponding rotational movement of the rotor;

reflective photoelectric means disposed within the stator for sensing rotational movement of the rotor and producing corresponding electrical output signals; and speed monitoring circuit means connected electrically to the photoelectric means and the motor control means for measuring the rotational speed of the rotor and sending regulatory electrical signals to the motor control means.

2. A motor speed control system as set forth in claim 1 wherein the photoelectric means includes an annular array of alternate light reflective spots and light absorbent areas circumferentially disposed on the rotor.

3. A motor speed control system as set forth in claim 2 wherein the photoelectric means includes a light source and a photosensitive device optically coupled to a common reference area of the array.

4. A motor speed control system as set forth in claim 3 wherein the light source and the photosensitive device are angularly disposed with respect to one another and are supported within the stator.

5. A motor speed control system as set forth in claim 4 wherein said stator includes a pole piece and the light source and the photoelectric device are supported within respective apertures in said pole piece.

6. A rotational speed control system including:

an electric motor comprised of a cylindrical rotor and an electromagnetic field producing means surrounding a portion of the rotor for directing a field of magnetic flux through said portion and rotating said rotor correspondingly;

motor control means electrically connected to said electromagnetic field producing means for energizing said field producing means to produce a corresponding field of magnetic flux;

photoelectric means supported within said electromagnetic field producing means for sensing rotation of said rotor and producing corresponding electrical signals; and speed monitoring circuit means connected electrically to said photoelectric means and said motor control means for determining the speed of rotation of said rotor and sending regulatory electrical signals to said motor control means.

7. A rotational speed control system including:

an electric motor comprised of a hollow cylindrical stator and a cylindrical rotor having a portion disposed within said stator;

motor control means electrically connected to said stator for sending an electrical current therethrough and rotating said rotor correspondingly;

light reflecting means disposed on said portion of the rotor for reflecting light in accordance with the rotation of said rotor;

optical means embedded in said stator for receiving reflected light from said light reflecting means and producing electrical signals corresponding to the rotation of said rotor; and speed monitoring circuit means connected electrically to said optical means and said motor control means for determining the speed of rotation of said motor and sending regulatory electrical signals to said motor control means.

8. A rotational speed control system as set forth in claim 7 wherein said optical means includes light source means disposed for receiving directing light onto said light reflecting means.

9. A system including:

an x-ray tube comprised of an envelope having therein a cylindrical rotor, an anode target mounted for rotation on said rotor, and a cathode disposed to direct electrons onto said anode target;

light reflective means disposed on an annular portion of said rotor for reflecting light radially of the rotor in accordance with the speed of rotation of said target;

stator means disposed externally of said envelope and surrounding said annular portion of the rotor for magnetically coupling to said rotor and producing rotation of said target;

optical means disposed within the stator means for receiving said reflected light and producing corresponding electrical signals; and electrical control means connected electrically between said optical means and said stator means for receiving said electrical signals and sending regulatory electrical signals to said stator means.

10. A system as set forth in claim 9 wherein said stator means includes means for shielding said optical means from radiation extraneous to light reflected from said reflective means.

11. A system as set forth in claim 10 wherein said optical means includes light transmitting means disposed for directing light onto said light reflective means and light detector means disposed for receiving light reflected from said light reflective means.

12. A system as set forth in claim 11 wherein said shielding means includes respective apertures disposed in the stator means for supporting the light transmitting means and the light detector means in optical alignment with the light reflective means.

13. A system as set forth in claim 9 wherein said cathode is heatable to incandescence and a portion of said anode target is disposed between said cathode and said light receiving means.

14. A system as set forth in claim 13 wherein said anode target comprises an axially rotatable disc having an outer marginal portion disposed between said cathode and said light receiving means.

15. In combination:

an envelope;

a cylindrical rotor mounted for axial rotation with the envelope;

an electrode mounted on said rotor for rotation therewith;

a light reflective means disposed on an annular portion of said rotor for reflecting light radially thereof in accordance with the speed of rotation of said target;

a stator disposed externally of the envelope and surrounding said annular portion of the rotor;

light receiving means embedded in said stator and optically aligned with said light reflective means for receiving light reflected therefrom and producing corresponding electrical signals; and control means connected electrically between said light receiving means and said stator for receiving said electrical signals from the light receiving means and sending regulatory electrical signals to the stator.

* * * * *